(12) United States Patent
Steijaert et al.

(10) Patent No.: US 11,679,495 B2
(45) Date of Patent: Jun. 20, 2023

(54) PLANAR MULTI-JOINT ROBOT ARM SYSTEM

(71) Applicant: VDL Enabling Technologies Group B.V., Eindhoven (NL)

(72) Inventors: Hans Alphonsius Maria Steijaert, Eindhoven (NL); Robert Cornelis Henricus Boereboom, Eindhoven (NL)

(73) Assignee: VDL ENABLING TECHNOLOGIES GROUP B.V., Eindhoven (NL)

( * ) Notice: Subject to any disclaimer, the term of this patent is extended or adjusted under 35 U.S.C. 154(b) by 135 days.

(21) Appl. No.: 16/769,796

(22) PCT Filed: Dec. 6, 2018

(86) PCT No.: PCT/NL2018/050818
§ 371 (c)(1),
(2) Date: Jun. 4, 2020

(87) PCT Pub. No.: WO2019/112432
PCT Pub. Date: Jun. 13, 2019

(65) Prior Publication Data
US 2021/0170577 A1    Jun. 10, 2021

(30) Foreign Application Priority Data
Dec. 8, 2017  (NL) .................................. 2020044

(51) Int. Cl.
*B25J 9/10* (2006.01)
*B25J 9/12* (2006.01)
*B25J 11/00* (2006.01)

(52) U.S. Cl.
CPC .............. *B25J 9/107* (2013.01); *B25J 9/126* (2013.01); *B25J 11/0095* (2013.01)

(58) Field of Classification Search
CPC . B25J 9/042; B25J 9/1065; B25J 9/107; B25J 11/0095; B25J 9/106; B25J 9/126; B25J 15/0014; B25J 17/02
See application file for complete search history.

(56) References Cited

U.S. PATENT DOCUMENTS 5,049,029 A * 9/1991 Mitsui ............... H01L 21/67742
414/935
5,147,175 A * 9/1992 Tada ........................ B25J 9/107
414/744.5

(Continued)

FOREIGN PATENT DOCUMENTS

JP    2001-206314 A    7/2001
JP    2014-111299 A    6/2014

*Primary Examiner* — Joseph Brown
(74) *Attorney, Agent, or Firm* — Nixon Peabody LLP

(57) ABSTRACT

The invention relates to a planar multi-joint robot arm system. An example of such planar multi-joint robot arm system comprises a base platform having a longitudinal axis, a product manipulator having a longitudinal axis perpendicular to the longitudinal axis of the base platform, a double crank-conrod mechanism consisting of a first crank-conrod link and a second crank-conrod link, wherein both the first and the second crank-conrod links having a crank end connected to the base platform and a conrod end connected to the product manipulator, and as well as a link element linking both crank-conrod joints of the first and the second crank-conrod links, a first driving unit arranged for rotating the crank end of the first crank-conrod link of the double crank-conrod mechanism, a multi-joint arm having first arm end connected to the base platform and a second arm end connected to the product manipulator as well as a second driving unit arranged for rotating the first arm end of the multi-joint arm.
Herewith the construction of the product manipulator and the double crank-conrod mechanism has a more balanced (Continued)

design, and as such the mass and inertia of the overall construction are reduced significantly.

12 Claims, 3 Drawing Sheets

(56) References Cited

U.S. PATENT DOCUMENTS

| | | | | |
|---|---|---|---|---|
| 5,447,409 | A * | 9/1995 | Grunes | B25J 9/126 |
| | | | | 414/935 |
| RE37,731 | E * | 6/2002 | Ogawa | H01L 21/67742 |
| | | | | 414/935 |
| 6,558,107 | B1 * | 5/2003 | Okuno | B25J 9/107 |
| | | | | 414/744.5 |
| 2001/0004852 | A1 * | 6/2001 | Mitsuyoshi | B25J 9/1065 |
| | | | | 74/490.01 |
| 2004/0154426 | A1 * | 8/2004 | Byun | B25J 9/107 |
| | | | | 74/490.01 |
| 2010/0111649 | A1 * | 5/2010 | Minami | B25J 9/0072 |
| | | | | 414/217 |
| 2010/0178136 | A1 * | 7/2010 | Ago | B25J 9/042 |
| | | | | 414/217 |
| 2013/0084156 | A1 * | 4/2013 | Shimamoto | H01L 21/677 |
| | | | | 414/744.5 |
| 2013/0202398 | A1 * | 8/2013 | Watanabe | H01L 21/67742 |
| | | | | 414/744.6 |
| 2014/0020500 | A1 * | 1/2014 | Briot | B25J 17/0266 |
| | | | | 901/15 |
| 2014/0250678 | A1 * | 9/2014 | Watanabe | H05K 13/0015 |
| | | | | 414/751.1 |
| 2015/0360373 | A1 | 12/2015 | Kim | |
| 2016/0263743 | A1 * | 9/2016 | Tokai | B25J 9/107 |

* cited by examiner

PLANAR MULTI-JOINT ROBOT ARM SYSTEM

CROSS REFERENCE TO RELATED APPLICATIONS

This application is a U.S. National Stage Application of International Patent Application No. PCT/NL2018/050818 filed on Dec. 6, 2018, which claims priority to NL Patent Application No. 202004, filed Dec. 8, 2017, each of which is incorporated herein by reference in its entirety.

The invention relates to a planar multi-joint robot arm system.

Such planar multi-joint robot arm system are a generally known concept for assembly robots. In general such type of planar multi-joint robot arm systems are also indicated as Selective Compliance Articulated Robot Arm (SCARA). SCARA robot arm are generally faster and cleaner than comparable Cartesian robot systems. Their single pedestal mount requires a small footprint and provides an easy, unhindered form of mounting.

In particular planar multi-joint robot arm systems are capable of converting a rotational movement into a translation movement, making them versatile in robotic manufacturing or construction environments performing one specific movement in a repetitive manner. In particular due to its construction the product manipulator is rigid in the Z-axis orientation and pliable in the XY-plane, allowing it to perform accurate operations within the XY-plane in a repetitive manner, in general 8-10 million times.

Due to its accurateness and repetitiveness planar multi-joint robot arm systems are implemented for example in vacuum controlled environment for wafer substrate handling in the semiconductor manufacturing industry.

A drawback of the presently known planar multi-joint robot arm systems is their limited life span to a maximum of 8-10 million operations, due to an unbalanced construction of the product manipulator, as well as the high mass and inertia of the multi-joint product manipulator. This will lead to undesired high loads on the joints between the hinging parts of the system. Also a high mass calls for high motor performance of the driving units, which in turn increases the costs of driving units and controller used. As such an over constrained system design will occur over time, resulting in reliability problems, inaccuracies during product manipulator movements due to excessive position dependent tilt and ultimately in unscheduled standstill. All this will decrease the reliability of the system, which is undesirable in high accurate processes such as wafer substrate handling.

It is an object of the present invention to provide a planar multi-joint robot arm system which implements a design that does not suffer from the above identified constructional drawback.

An example of a planar multi-joint robot arm system according to the invention hereto comprises
- a base platform having a longitudinal axis,
- a product manipulator having a longitudinal axis perpendicular to the longitudinal axis of the base platform,
- a double crank-conrod mechanism consisting of a first crank-conrod link and a second crank-conrod link, wherein both the first and the second crank-conrod links having a crank end connected to the base platform and a conrod end connected to the product manipulator, and as well as a link element linking both crank-conrod joints of the first and the second crank-conrod links,
- a first driving unit arranged for rotating the crank end of the first crank-conrod link of the double crank-conrod mechanism,
- a multi-joint arm having first arm end connected to the base platform and a second arm end connected to the product manipulator as well as
- a second driving unit arranged for rotating the first arm end of the multi-joint arm.

Herewith the construction of the product manipulator and the double crank-conrod mechanism has a more balanced design, and as such the mass and inertia of the overall construction are reduced significantly. Because the payload of the product manipulator is supported at the base platform at three positions instead of one or two, the resulting construction will experience lower frictional and gravital forces in its joints of the. Similarly the reduction in mass and inertia results in lower amplitudes during movements in the XY-plane due to disturbances. When implemented in a vacuum controlled environment for wafer substrate handling in the semiconductor manufacturing industry this will further reduce any risk on wafer damage and contamination, and thus further improving the accuracy of the manipulation of the product manipulator.

Furthermore its simplified design obviates more complex and expensive system parts, such as over dimensioned driving units, further limiting mechanical failures.

In a further example the planar multi-joint robot arm system further comprises a third driving unit arranged for rotating the base platform around its longitudinal axis. This allows rotation of the product manipulator within the XY-plane relative to ground, adding an additional functionality of the system in terms of product handling.

In particular both crank ends of the double crank-conrod mechanism are both positioned at one side of the longitudinal axis of the product manipulator, whereas in a further example both crank ends of the double crank-conrod mechanism are positioned at opposite sides of a first centerline of the base platform, which first centerline is perpendicular to the longitudinal axis of the base platform.

These design solutions provide a more balanced design of the product manipulator with a reduced mass and inertia. As such excessive position dependent tilt during the movements of the product manipulator are reduced and the reliability of the system is further increased, as inaccuracies during product manipulator movements due to tilt significantly reduced.

In yet another example the first arm end of the multi-joint arm is positioned at the other side of the longitudinal axis of the product manipulator.

In yet another advantageous example of the planar multi-joint robot arm system the crank end of the second crank-conrod link and the first arm end of the multi-joint arm are positioned at the same side of and at different distances from the first centerline.

BRIEF DESCRIPTION OF THE DRAWINGS

The invention will now be described in more details in reference to the accompanying drawings, which drawings show in.

DETAILED DESCRIPTION OF THE INVENTION

Figure 1:
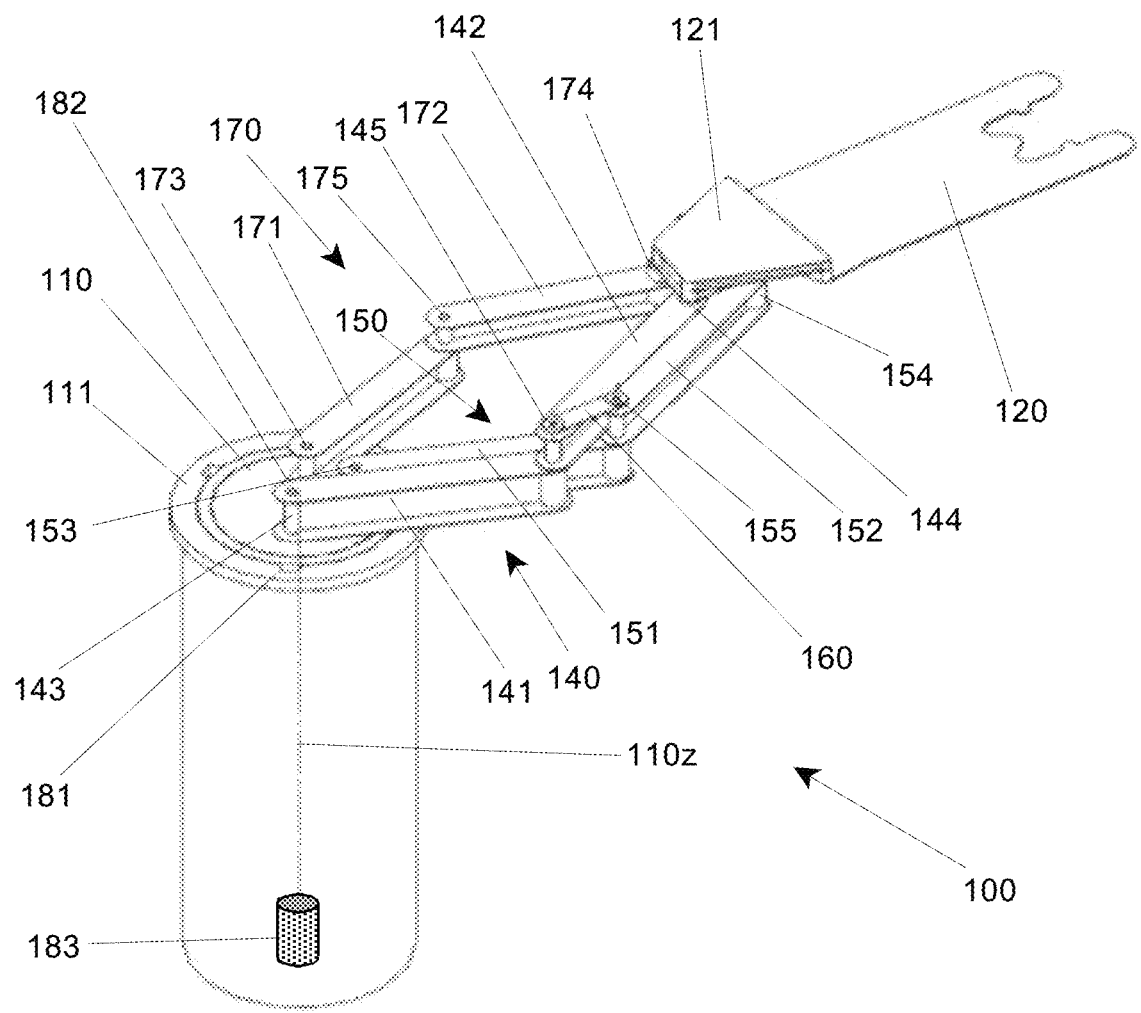
FIGS. 1-3 a schematic example of a planar multi-joint robot arm system according to the invention.

For a better understanding of the invention like parts in the drawings are to be denoted with like reference numerals.

Figure 2:
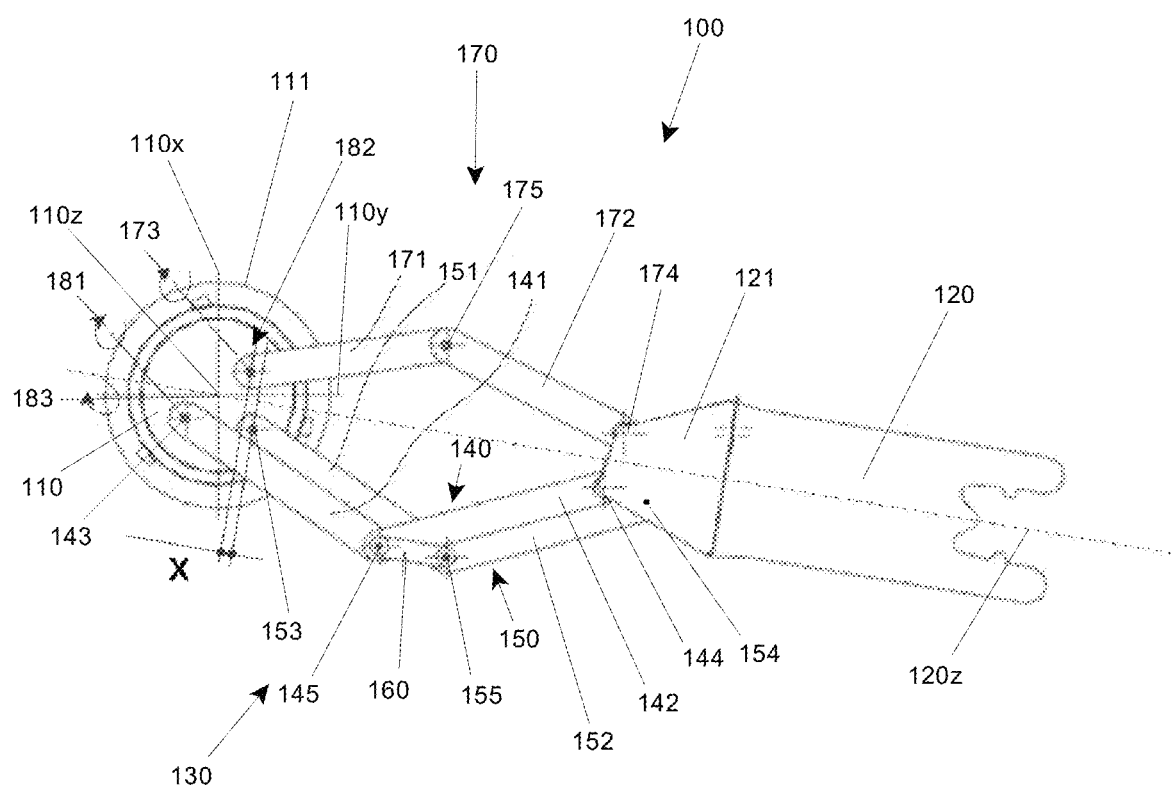
Figure 3:
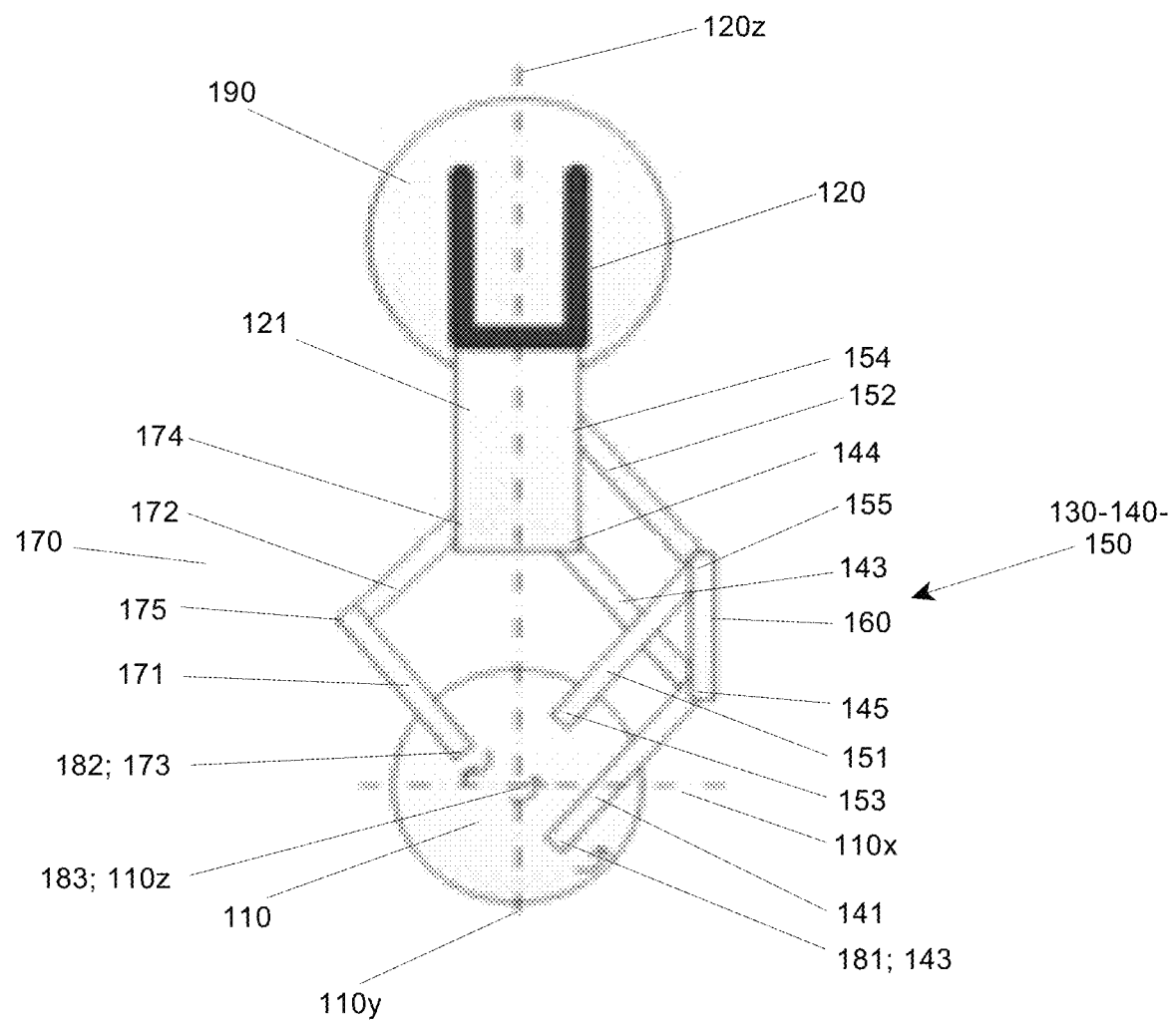

In the FIGS. 1-3 reference numeral 100 denotes an example of a planar multi joint robot arm system according to the invention. The planar multi joint robot arm system consists of three main element parts, that is a platform pedestal 111, a double crank-conrod mechanism 130 and a product manipulator 120. The double crank-conrod mechanism 130 is mounted to a base platform 110 which is part of the platform pedestal 111. Likewise the product manipulator 120 is mounted with its product manipulator mount 121 to the double crank-conrod mechanism. The product manipulator 120 serves to handle products for example wafer substrates 190 on which integrated circuits are produced in the semi-conductor manufacturing industry.

Within the pedestal 111 a first driving unit 181 is positioned for rotatable driving one of the joints of the double crank-conrod mechanism 130. This rotating movement is transformed into a translational movement of the double crank-conrod mechanism 130 in an XY-plane perpendicular to the longitudinal axis 110z of the platform pedestal/base platform 111-110. The translational movement of the double crank-conrod mechanism 130 in the XY-plan is likewise transferred to the product manipulator 120.

Due to this conversion of a rotational movement in a translation movement of the product manipulator 120, the planar multi-joint robot arm system 100 is versatile in robotic manufacturing or construction environments in performing on specific movement in a repetitive manner. As will be explained further in this figurative description, due to its construction of the planar multi-joint robot arm system the product manipulator 120 is rigid in the Z-axis orientation (along the longitudinal axis 110z) but pliable in the XY-plane perpendicular to set axis 110z. This allows the planer multi-joint robot arm system to perform accurate operations within the XY-plane in repetitive manner, meaning translational movements of the product manipulator 120. Due to its accurateness and repetitiveness the planar multi-joint robot arm system according to the invention is highly suitable for implementation in for example vacuum controlled environments for the handling of wafer substrates 190 by said product manipulator 120 in the semiconductor manufacturing industry.

The double crank-conrod mechanism 130 is composed of a first crank-conrod link 140 and a second crank-conrod link 150. Both the first and second crank-conrod link 140-150 are composed of two elements, a crank 141-151 and a conrod 142-152. The crank 141 (151) and the conrod 142 (152) of both first and second crank-conrod links 140-150 are joint or linked together by means of a hinge or joint 145 (155). Moreover each conrod 144 (154) is hingely connected with the product manipulator mount 121.

As shown in the FIGS. 1 and 2 furthermore the crank ends 143 (153) of both cranks 141 (151) of the first and second crank-conrod link 141 (150) are mounted to the base platform 110 of the platform pedestal 111. Reference numeral 160 denotes a link element or strip like element or bar which interconnects both joints 145-155 between the crank and conrod parts of the first and second crank-conrod links 140-150. As such both the first and second crank-conrod link 140-150 form an interconnected frame of links (parallelogram). Both crank ends 143 (153) of the crank 141 (151) of the first and second crank-conrod link 140-150 are rotatably mounted to the base platform 110. In the rotatable crank end 143 is rotatable around a rotating axis which is parallel to the longitudinal axis 110Z and is rotably driven by a first driving unit 181. The driving unit 181 is preferably an electro motor.

Rotating the crank 141 by means of the first driving unit 181 around its pivot point 143 where the crank end 143 is connected to the base platform 110 results in a rotating movement of the crank 141 relative to the base platform 110 which rotating movement is converted in a translational movement through the double crank-conrod mechanism 130 of the product manipulator 120 in an XY-plane which is orientated perpendicular to the axis of rotation around the pivot point 143. The XY-plane in which the product manipulator translates is orientated perpendicular to the longitudinal axis Z of the platform pedestal 111.

In order to improve the design of the planar multi-joint robot arm system in terms of balance and reduce mass and inertia according to the invention the double crank-concord mechanism furthermore comprises a multi-joint arm which is indicated with reference numeral 170. The multi-joint arm 170 is composed of two arm links indicated with reference numeral 171 and 172. Both the first arm link 171 and the second arm link 172 are joined together by means of an intermediate hinge joint 175. Next to that, the other end 174 of the second arm link is connected with the product manipulator mount 121.

Arm end 173 of the first arm link 171 is rotatably mounted to the base platform 110. Reference numeral 182 denotes a second driving unit which is mounted within the platform pedestal 111 for rotatably driving the first arm link 171 around its pivot point 173. The second driving unit 182 is preferably an electro motor. Together with the driving action of the first driving unit 181 both the double crank control mechanism 130 and the multi-joint arm 170 are driven by their respective first and second driving units 181-182 relative to the base platform 110 and create the translational movements of the product manipulator within the XY-plane perpendicular to the longitudinal set-axis 110z.

Reference numeral 183 denotes a third driving unit which is mounted within the platform pedestal 111 for rotatably driving the whole base platform 110 around its longitudinal Z-axis 110z, as a result of which the complete construction formed by the double crank-conrod mechanism 130/multi-joint arm 170/product manipulator 120 within the XY-plane relative to the platform pedestal 110. The third driving unit 183 is preferably an electro motor.

As observed in FIGS. 2 and 3 the platform pedestal 111/base platform 110 has a first and second centerline 110x-110y which together with the longitudinal axis 120z of the product manipulator 120 forms the XY-plane in which the product manipulator 120 performs its translational movements as a result of the rotational operation of the double crank-conrod mechanism 130 and the multi-joint arm 170 by means of the first and second driving unit 181-182. It is noted that both cranks 141-151 of the first and second crank-conrod links 140-150 of the double crank-conrod mechanism 130 are mounted at the base platform 110 with their respective crank ends 143-153 at one side relative to the longitudinal axis 120z of the product manipulator 120. On the opposite site of said longitudinal axis 120z is the multi-joint arm 170 mounted to the base platform 110, by means of the arm end 173 of the first arm link 171.

In addition both crank ends 143-153 of the cranks 141-151 of the first and second crank-conrod links 140-150 are positioned at opposite sides of a first centerline 110x of the base platform and preferably at equal distances from said centerline. The drivable arm end 173 of the first arm link 171 and the non-driven crank end 153 of the second crank-conrod link 150 are located at opposite sides of the second centerline 110y and the longitudinal axis 120z of the product manipulator 120, but are located at the same side relative to the first centerline 110x opposite to the side where the drivable crank end 143 of the crank 141 of the first crank-conrod link 140 is mounted to the base platform 110. It is noted that both the drivable arm end 173 and the non-drivable crank end 153 are located at different distances relative to the first centerline 110x, which distance difference is denoted in FIG. 2 with X.

All these design solutions provide a more balanced design of the product manipulator relative to the base platform 110/platform pedestal 111 with a reduced mass and inertia. As such excessive position dependent tilt during the movements of the product manipulator 120 are reduced and reliability of the system is significantly enhanced, as inaccuracies during product manipulator movements due to tilt are significantly reduced.

In the prior art several SCARA type planar multi-joint robot arm systems implement pre-stressed steel bands or toothed belts to manipulate the arms based on which the product manipulator 120 performs its translational movements within the XY-plane. The use and mounting of the steel bands (toothed belts) in a pre-stressed or pre-tensioned condition require a robust constructions of the robot arms in order to be able to take up that preload. As such the prior art systems are heavy in weight and as such also over constrained in terms of dimensions and drive units.

In addition the prior art planar multi-joint robot arm systems implement a robot arm, where the coupling between the arm and the product manipulator with a three degrees of freedom (X, Y and Rz) exhibits a significant compliance due to its weight.

With the present invention such pre-tensioned band drive mechanism is used, and as a result, the arms of the robot system are constructed lighter. This results in a considerable reduction in mass and mass inertia and as such a more reliable construction, as inaccuracies during product manipulator movements due to tilt are significantly reduced. Furthermore the original compliance of the prior art coupling between the robot arm and the product manipulator is replaced by the compliance of the three link robot arm itself, being coupled with the platform pedestal, resulting is a further weight reduction.

LIST OF REFERENCE NUMERALS 100 planar multi-joint robot arm system
110 base platform
110x first centerline of base platform
110y second centerline of base platform
110z longitudinal axis of base platform
111 platform pedestal
120 product manipulator
120z longitudinal axis of product manipulator
121 product manipulator mount
130 double crank-conrod mechanism
140 first crank-conrod link
141 crank of first crank-conrod link
142 conrod of first crank-conrod link
143 crank end of first crank-conrod link
144 conrod end of first crank-conrod link
145 joint of first crank-conrod link
150 second crank-conrod link
151 crank of second crank-conrod link
152 conrod of second crank-conrod link
153 crank end of second crank-conrod link
154 conrod end of second crank-conrod link
155 joint of second crank-conrod link
160 link element of double crank-conrod mechanism
170 multi-joint arm
171 first arm link
172 second arm link
173 first arm end of multi-joint arm
174 second arm end of multi-joint arm
175 intermediate joint between first and second arm link of multi-joint arm
181 first driving unit
182 second driving unit
183 third driving unit
190 product (wafer)

The invention claimed is:

1. A planar multi joint robot arm system comprising
    a base platform having a longitudinal z-axis and a xy-plane formed by a first and second centerline, the xy-plane being perpendicular to the longitudinal z-axis,
    a product manipulator having a longitudinal axis perpendicular to the longitudinal z-axis of the base platform and being perpendicular to the first centerline,
    a double crank-conrod mechanism consisting of a first crank-conrod link and a second crank-conrod link, wherein both the first and the second crank-conrod links having a crank end connected to the base platform and a conrod end connected to the product manipulator, and as well as a link element linking both crank-conrod joints of the first and the second crank-conrod links,
    a first driving unit arranged for rotating the crank end of the first crank-conrod link of the double crank-conrod mechanism,
    a multi joint arm having a first arm end connected to the base platform and a second arm end connected to the product manipulator as well as
    a second driving unit arranged for rotating the first arm end of the multi-joint arm,
    wherein the crank end of the second crank-conrod link and the first arm end of the multi-joint arm are positioned at the same side of and at different distances from the first centerline of the base platform, the first centerline being perpendicular to the longitudinal z-axis of the base platform.

2. The planar multi joint robot arm system according to claim 1, further comprising a third driving unit arranged for rotating the base platform around its longitudinal z-axis.

3. The planar multi joint robot arm system according to claim 1, wherein both crank ends of the double crank-conrod mechanism are both positioned at one side of the longitudinal axis of the product manipulator.

4. The planar multi joint robot arm system according to claim 3, further comprising a third driving unit arranged for rotating the base platform around its longitudinal z-axis.

5. The planar multi joint robot arm system according to claim 3, wherein both crank ends of the double crank-conrod mechanism are positioned at opposite sides of the first centerline of the base platform.

6. The planar multi joint robot arm system according to claim 5, further comprising a third driving unit arranged for rotating the base platform around its longitudinal z-axis.

7. A planar multi joint robot arm system comprising
    a base platform having a longitudinal z-axis and a xy-plane formed by a first and second centerline, the xy-plane being perpendicular to the longitudinal z-axis,
    a product manipulator having a longitudinal axis perpendicular to the longitudinal z-axis of the base platform and being perpendicular to the first centerline,
    a double crank-conrod mechanism consisting of a first crank-conrod link and a second crank-conrod link, wherein both the first and the second crank-conrod links having a crank end connected to the base platform and a conrod end connected to the product manipulator, and as well as a link element linking both crank-conrod joints of the first and the second crank-conrod links, a first driving unit arranged for rotating the crank end of the first crank-conrod link of the double crank-conrod mechanism, a multi joint arm having a first arm end connected to the base platform and a second arm end connected to the product manipulator as well as a second driving unit arranged for rotating the first arm end of the multi-joint arm, wherein both crank ends of the double crank-conrod mechanism are both positioned at one side of the longitudinal axis of the product manipulator, wherein both crank ends of the double crank-conrod mechanism are positioned at opposite sides of the first centerline of the base platform, which first centerline is perpendicular to the longitudinal z-axis of the base platform.

8. The planar multi joint robot arm system according to claim 7, wherein the first arm end of the multi joint arm is positioned at the other side of the longitudinal axis of the product manipulator.

9. The planar multi joint robot arm system according to claim 8, further comprising a third driving unit arranged for rotating the base platform around its longitudinal z-axis.

10. The planar multi joint robot arm system according to claim 8, wherein the crank end of the second crank-conrod link and the first arm end of the multi-joint arm are positioned at the same side of and at different distances from the first centerline.

11. The planar multi joint robot arm system according to claim 10, further comprising a third driving unit arranged for rotating the base platform around its longitudinal z-axis.

12. The planar multi joint robot arm system according to claim 7, further comprising a third driving unit arranged for rotating the base platform around its longitudinal z-axis.

* * * * *